United States Patent
Keanini et al.

(10) Patent No.: US 11,157,834 B2
(45) Date of Patent: Oct. 26, 2021

(54) AUTOMATED IDENTIFICATION OF HIGHER-ORDER BEHAVIORS IN A MACHINE-LEARNING NETWORK SECURITY SYSTEM

(71) Applicant: Cisco Technology, Inc., San Jose, CA (US)

(72) Inventors: Timothy David Keanini, Austin, TX (US); Jeffrey Markey, Sterling, VA (US); Jesse Craig-Goodell, Tucker, GA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 538 days.

(21) Appl. No.: 16/031,206

(22) Filed: Jul. 10, 2018

(65) Prior Publication Data

US 2020/0019889 A1    Jan. 16, 2020

(51) Int. Cl.
*G06F 7/00*      (2006.01)
*G06N 20/00*     (2019.01)
*G08C 17/02*     (2006.01)

(52) U.S. Cl.
CPC ............. *G06N 20/00* (2019.01); *G08C 17/02* (2013.01)

(58) Field of Classification Search
CPC ........ G06N 20/00; G06N 5/022; G06N 5/045; G08C 17/02; H04L 63/1408; H04L 63/1433; H04L 63/1458
USPC ......................................................... 706/12
See application file for complete search history.

(56) References Cited

U.S. PATENT DOCUMENTS

| | | | | |
|---|---|---|---|---|
| 8,448,245 | B2* | 5/2013 | Banerjee | H04L 63/1433 726/22 |
| 10,237,294 | B1* | 3/2019 | Zadeh | H04L 63/1425 |
| 10,673,880 | B1* | 6/2020 | Pratt | H04L 63/1425 |
| 2015/0205693 | A1* | 7/2015 | Seto | G06F 11/3466 702/186 |
| 2017/0316346 | A1* | 11/2017 | Park | G06F 21/6263 |
| 2019/0260786 | A1* | 8/2019 | Dunn | G06K 9/6218 |

OTHER PUBLICATIONS

M. Kopp, et al., "Evaluation of Association Rules Extracted during Anomaly Explanation", J. Yaghob (Ed.): ITAT 2015 pp. 143-149, Charles University in Prague, Prague, 2015, 7 pages.

(Continued)

*Primary Examiner* — Naomi J Small
(74) *Attorney, Agent, or Firm* — Edell, Shapiro & Finnan, LLC

(57) ABSTRACT

In one example embodiment, a server compares derived values of a plurality of machine learning features with specified values of the plurality of machine learning features according to an ontology that defines a relationship between the plurality of machine learning features and a corresponding higher-order behavior for the specified values of the plurality of machine learning features. When the derived values of the plurality of machine learning features match the specified values of the plurality of machine learning features, the server aggregates the weights of the plurality of machine learning features to produce an aggregated weight. The server assigns the aggregated weight to the higher-order behavior so as to indicate a significance of the higher-order behavior in producing the machine learning result.

20 Claims, 6 Drawing Sheets

(56) References Cited

OTHER PUBLICATIONS

D. Brauckhoff, et al., "Anomaly Extraction in Backbone Networks Using Association Rules", Proceedings of the 9th ACM SIGCOMM conference on Internet measurement conference, 2009, pp. 28-34, <hal-00527139>, 8 pages.

F. Silveira, et al., "URCA: Pulling out Anomalies by their Root Causes", 2010 Proceedings IEEE INFOCOM, Mar. 14-19, 2010, San Diego, CA, 9 pages.

"Proposed Flow Data Ontology for RDF", V1.0, Dec. 16, 2014, Copyright 2014 Open Cyber Ontology Working Group, www.opencog.net, 10 pages.

J. Undercoffer, et al., "A Target-Centric Ontology for Intrusion Detection", University of Maryland, Baltimore County, Department of Computer Science and Electrical Engineering, Workshop on Ontologies in Distributed Systems, held at the 18th International Joint Conference on Artificial Intelligence, 2003, 8 pages.

Alex Galis, et al., Conference Paper, "Towards Automatic Traffic Classification", Jun. 2007, DOI: 10.1109/ICNS.2007.120 Source: DBLP, https://www.researchgate.net/publication/221636215, 11 pages.

B. Letham, et al., "Interpretable Classifiers Using Rules and Bayesian Analysis: Building a Better Stroke Prediction Model", The Annals of Applied Statistics, 2015, vol. 9, No. 3, 1350-1371, DOI: 10.1214/15-AOAS848, Institute of Mathematical Statistics, arXiv:1511.01644v1 [stat.AP], Nov. 5, 2015, 23 pages.

"Overview—ELI5 0.7 Documentation", https://eli5.readthedocs.io/en/latest/overview.html, downloaded from the internet on Jun. 12, 2018, 5 pages.

Marco Tulio Ribeiro, et al., "Anchors: High-Precision Model-Agnostic Explanations", AAAI Conference on Artificial Intelligence, Feb. 7, 2018, 9 pages.

Marco Tulio Ribeiro, et al., ""Why Should I Trust You?" Explaining the Predictions of Any Classifier", arXiv:1602.04938v1 [cs.LG], Feb. 16, 2016, Proceedings of the 22nd ACM SIGKDD International Conference on Knowledge Discovery and Data Mining, ACM, 2016, 15 pages.

\* cited by examiner

AUTOMATED IDENTIFICATION OF HIGHER-ORDER BEHAVIORS IN A MACHINE-LEARNING NETWORK SECURITY SYSTEM

TECHNICAL FIELD

The present disclosure relates to securing computer networks against security threats.

BACKGROUND

Machine learning is a field of study that gives computers the ability to learn without being explicitly programmed. Machine learning techniques have advanced over the years in their ability to learn and draw conclusions. For example, machine learning techniques have been applied to the field of cyber-security to protect computer networks. As machine learning decision-making becomes more complex in the cyber-security context, it is important to understand how/why such decisions are made.

DESCRIPTION OF EXAMPLE EMBODIMENTS

Overview

In one example embodiment, a server (called a network security threat detection server herein) obtains network telemetry data representing statistics associated with one or more operations of network devices in a network, and generates derived values for machine learning features from the network telemetry data. The server applies a machine learning process to the machine learning features to produce a machine learning result representing whether the network telemetry data indicates a security threat to the network. The server assigns weights to the machine learning features so as to indicate a significance of the machine learning features in producing the machine learning result.

The server compares the derived values of a plurality of the machine learning features with specified values of the plurality of the machine learning features according to an ontology that defines a relationship between the plurality of the machine learning features and a corresponding higher-order behavior for the specified values of the plurality of the machine learning features. When the derived values of the plurality of the machine learning features match the specified values of the plurality of the machine learning features, the server aggregates the weights of the plurality of the machine learning features to produce an aggregated weight. The server assigns the aggregated weight to the higher-order behavior so as to indicate a significance of the higher-order behavior in producing the machine learning result.

Example Embodiments

Figure 1:
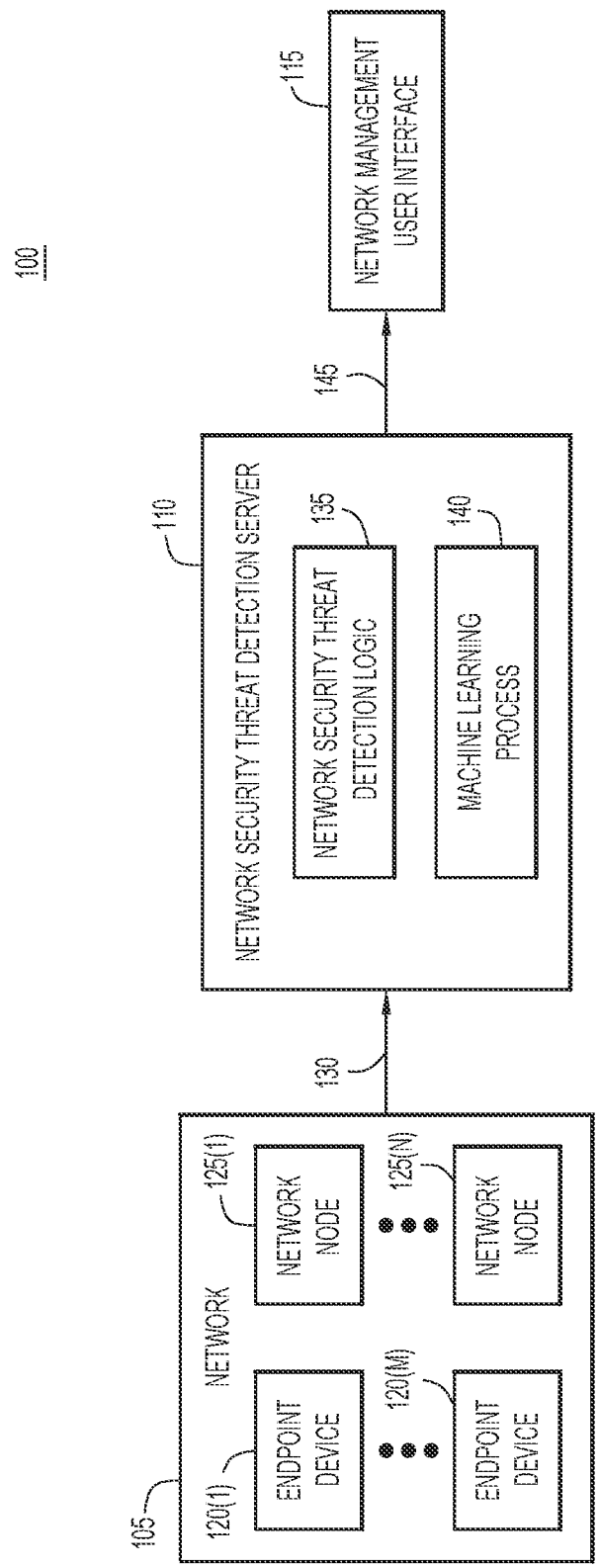
FIG. 1 is a block diagram of a system for automatically identifying higher-order behaviors in a network, according to an example embodiment.

FIG. 1 illustrates an example system 100 for automatically identifying higher-order behaviors in a network 105. System 100 includes the network 105, a network security threat detection server 110, and a network management user interface 115. Network 105 includes endpoint devices 120(1)-120(M) (e.g., user devices, servers, etc.) and network nodes (e.g., routers, switches, etc.) 125(1)-125(N) (collectively, "network devices"). The network devices perform activities/operations to facilitate the transmission of information (e.g., packets) in network 105. For example, network nodes 125(1)-125(N) may enable endpoint devices 120(1)-120(M) to communicate with each other and/or with devices external to network 105.

Network 105 may send certain statistics associated with one or more operations of the network devices to network security threat detection server 110 as network telemetry data. Accordingly, as represented at 130, the network security threat detection server 110 may obtain network telemetry data representing statistics associated with one or more operations of the network devices in network 105. In this example, network security threat detection server 110 includes network security threat detection logic 135, although it will be appreciated that network security threat detection logic 135 may be implemented on one or more devices (e.g., a network device of network 105, other server(s), etc.). Network security threat detection logic 135 may cause the network security threat detection server 110 to process the network telemetry data and generate derived values for the machine learning features from the network telemetry data.

Machine learning features are features of the network telemetry data that may be used as inputs to a machine learning process. Examples of machine learning features include a number of external peers to which the network device communicates, a number of external flows sent by the network device, a number of external bytes sent by the network device, etc. A derived value of a machine learning feature may include the actual measured number/value corresponding to the machine learning feature (e.g., zero, one, two, etc.).

Network security threat detection logic 135 may further cause the network security threat detection server 110 to apply a machine learning process 140 to the machine learning features. Examples of machine learning process 140 include classification, clustering, regression, anomaly detection, etc. Applying the machine learning process 140 to the machine learning features may produce a machine learning result representing whether the network telemetry data indicates a security threat to the network 105. Examples of machine learning results include anomalies, host classifications, targeted threat activity, etc.

Furthermore, network security threat detection logic 135 may cause the network security threat detection server 110 to assign weights to the machine learning features so as to indicate a significance of the machine learning features in producing the machine learning result. For example, if a first machine learning feature affected the machine learning result more than a second machine learning feature, the weight assigned to the first machine learning feature may be greater than the weight assigned to the second machine learning feature. The weights may be raw numbers, normalized percentages, etc.

Conventionally, network security threat detection server 110 would simply provide these weights to the network management user interface 115 for a user (e.g., network administrator, security analyst, business owner, etc.) to analyze. However, there are often a large number of fairly minor machine learning features which are impossible for a user to analyze. For example, several of the weights of the machine learning features may together indicate a pattern of how the machine learning process 140 handled the machine learning features, but the user may be unable to determine this pattern because of the complexity of the interrelationships of the machine learning features.

Accordingly, network security threat detection logic 135 is further configured to cause the network security threat detection server 110 to indicate a significance of a higher-order behavior in producing the machine learning result. This may enable the user to determine in an intuitive manner how the machine learning process 140 analyzed a plurality of the machine learning features. In one example, the network security threat detection logic 135 may define/reference an ontology that defines a relationship between the plurality of the machine learning features and a corresponding higher-order behavior for specified values (e.g., exact values, a range of values, etc.) of the plurality of the machine learning features.

Briefly, network security threat detection logic 135 may cause network security threat detection server 110 to compare the derived values of the plurality of machine learning features with the specified values of the plurality of machine learning features according to the ontology. When the derived values of the plurality of the machine learning features match the specified values of the plurality of the machine learning features, the network security threat detection server 110 may aggregate the weights of the plurality of the machine learning features to produce an aggregated weight, and assign the aggregated weight to the higher-order behavior. Network security threat detection server 110 may thereby indicate a significance of the higher-order behavior in producing the machine learning result.

As represented at 145, the network security threat detection server 110 may provide an indication of the aggregated weight and the higher-order behavior to network management user interface 115, which may include a display, keyboard, mouse, etc. The network security threat detection server 110 may cause the indication of the aggregated weight and the higher-order behavior to be displayed on network management user interface 115. This may enable the user to determine how the machine learning process 140 analyzed the plurality of machine learning features to produce the machine learning result.

An excerpt of an example ontology created using Web Ontology Language (OWL) is provided as follows:

```
<!-- Explainable Behaviors -->
<owl:Class rdf:about="rdfs:hosts#Does_not_communicate_with_external_systems">
<owl:equivalentClass>
<rdf:Description>
<owl:Restriction>
<owl:onProperty rdf:resource="total_external_packets"/>
<owl:hasValue rdf:total_external_packets="0"/>
</owl:Restriction>
</rdf:Description>
</owl:equivalentClass>
<rdf:Bag>
<rdfs:Literal rdf:langString="total_to_external_server_flows"/>
<rdfs:Literal rdf:langString="external_server_peers"/>
<rdfs:Literal rdf:langString="avg_flows_per_external_server_peer"/>
<rdfs:Literal rdf:langString="total_bytes_to_external_servers"/>
<rdfs:Literal rdf:langString="std_bytes_to_external_server"/>
<rdfs:Literal rdf:langString="total_bytes_from_external_server"/>
<rdfs:Literal rdf:langString="std_bytes_from_external_server"/>
<rdfs:Literal rdf:langString="avg_packet_size_to_external_servers"/>
<rdfs:Literal rdf:langString="avg_packet_size_from_external_servers"/>
<rdfs:Literal rdf:langString="total_to_external_client_flows"/>
<rdfs:Literal rdf:langString="external_client_peers"/>
<rdfs:Literal rdf:langString="avg_flows_per_external_client_peer"/>
<rdfs:Literal rdf:langString="total_bytes_to_external_clients"/>
<rdfs:Literal rdf:langString="std_bytes_to external_clients"/>
<rdfs:Literal rdf:langString="total_bytes_from_external_client"/>
<rdfs:Literal rdf:langString="std_bytes_from_external_client"/>
<rdfs:Literal rdf:langString="avg_packet_size_from_external_clients"/>
<rdfs:Literal rdf:langString="avg_packet_size_to_external_clients"/>
</rdf:Bag>
</owl:Class>
```

The example ontology defines a relationship between a plurality of machine learning features (e.g., the total number of flows a network device sends to an external server, the total number of external server peers of the network device, etc.) and a corresponding higher-order behavior (i.e., that the network device does not communicate with external systems). The example ontology indicates that when the plurality of machine learning features are each equal to zero, the higher-order behavior applies. That is, when there are zero flows sent to an external server, zero external server peers of the network device, etc., the ontology indicates that the network device does not communicate with external systems.

In this example, the network security threat detection server 110 may generate derived values of zero for each of the plurality of machine learning features, and compare the derived values with the specified values of the plurality of machine learning features in the ontology. Here, because the specified values in the ontology are also zero, the network security threat detection server 110 may aggregate the weights of the plurality of machine learning features to produce an aggregated weight.

Another excerpt of an example ontology created using OWL is provided as follows:

```
<!-- Host Features (Machine Learning) -->
<owl:DatatypeProperty rdf:about="rdfs:hosts#uses_port">
<rdfs:domain rdf:resource="unique_host"/>
<rdfs:range rdfs:Datatype="http://www.w3.org/2001/XMLSchema#nonNegativeInteger"/>
</owl:DatatypeProperty>
<owl:DatatypeProperty rdf:about="rdfs:hosts#uses_app_id">
<rdfs:domain rdf:resource="unique_host"/>
<rdfs:range rdfs:Datatype="http://www.w3.org/2001/XMLSchema#nonNegativeInteger"/>
</owl:DatatypeProperty>
<owl:DatatypeProperty rdf:about="rdfs:hosts#total_to_internal_server_flows">
<rdfs:domain rdf:resource="unique_host"/>
<rdfs:range rdfs:Datatype="http://www.w3.org/2001/XMLSchema#nonNegativeInteger"/>
</owl:DatatypeProperty>
<owl:DatatypeProperty rdf:about="rdfs:hosts#internal_server_peers">
<rdfs:domain rdf:resource="unique_host"/>
<rdfs:range rdfs:Datatype="http://www.w3.org/2001/XMLSchema#nonNegativeInteger"/>
</owl:DatatypeProperty>
```

This example ontology illustrates how machine learning features are expressed/defined. The domain (i.e., the object described by the machine learning feature, such as a unique host) and range (i.e., acceptable values) of the machine learning features are provided. This may enable the ontology to define how these machine learning features behave and are related to other machine learning features and/or higher-order behaviors. In one example, this ontology may relate to host classification (e.g., whether a network device is a web server that can only serve internal hosts).

Figure 2:
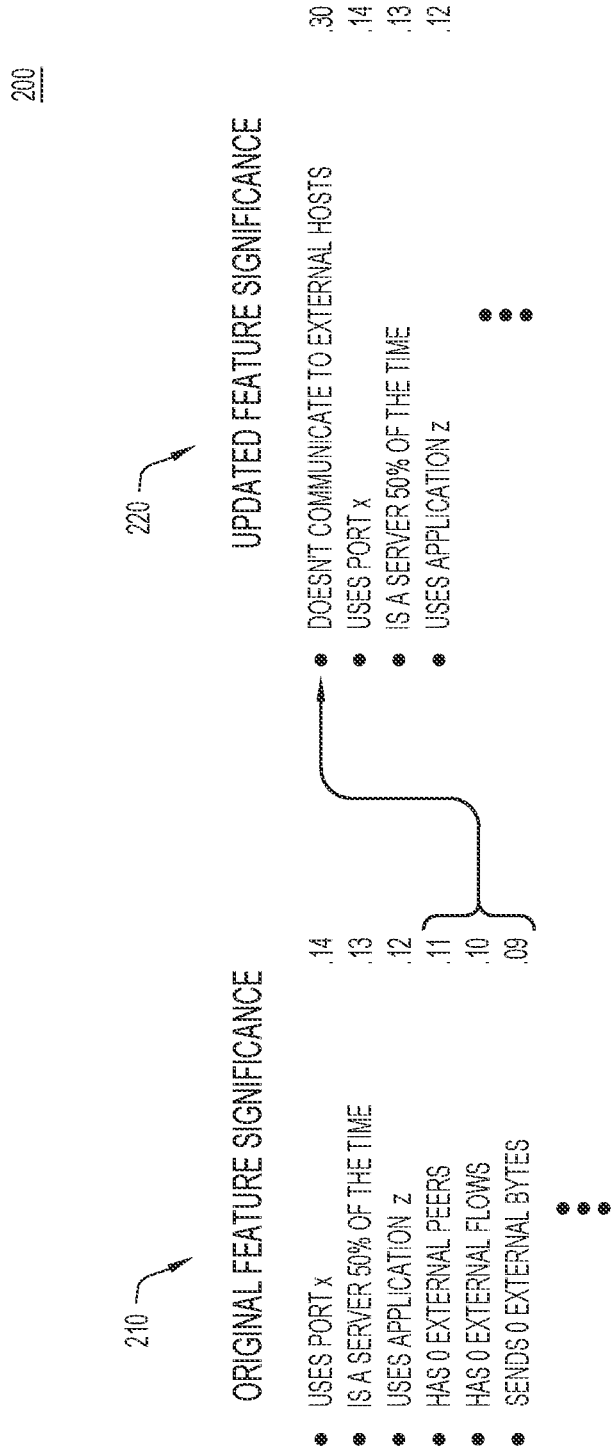
FIG. 2 is a diagrammatic illustration of an aggregation of weights of machine learning features to produce an aggregated weight for a higher-order behavior, according to an example embodiment.

FIG. 2 is a diagrammatic illustration 200 of an aggregation of weights of machine learning features to produce an aggregated weight for a higher-order behavior. FIG. 2 includes an original feature significance column 210 and an updated feature significance column 220. Original feature significance column 210 shows a plurality of machine learning features, derived values, and assigned weights. For example, "Has 0 external peers" may correspond to the machine learning feature "total number of external server peers of a network device" with a derived value of zero. This particular derived value for this machine learning feature has an assigned weight of 0.11. That is, the significance of this particular derived value for this machine learning feature in producing the machine learning result is represented by 11%. By way of example, if the derived value for this machine learning feature was three (i.e., "Has 3 external peers"), the assigned weight may be lower (e.g., 2%) because that machine learning feature is no longer as significant in producing the machine learning result.

Updated feature significance column 220 shows an aggregated weight of a higher-order behavior corresponding to the machine learning features in original feature significance column 210. Since the condition of not communicating with external hosts has been satisfied, "Has 0 external peers," "Has 0 external flows," and "Sends 0 external bytes" are replaced with a higher-order behavior that aggregates the weights of each of those individual machine learning features. In this example, "Has 0 external peers," "Has 0 external flows," and "Sends 0 external bytes" correspond to the higher-order behavior "Doesn't communicate to external hosts." The weights have been aggregated to produce the aggregated weight of 30% by summing 9%, 10%, and 11%.

Figure 3:
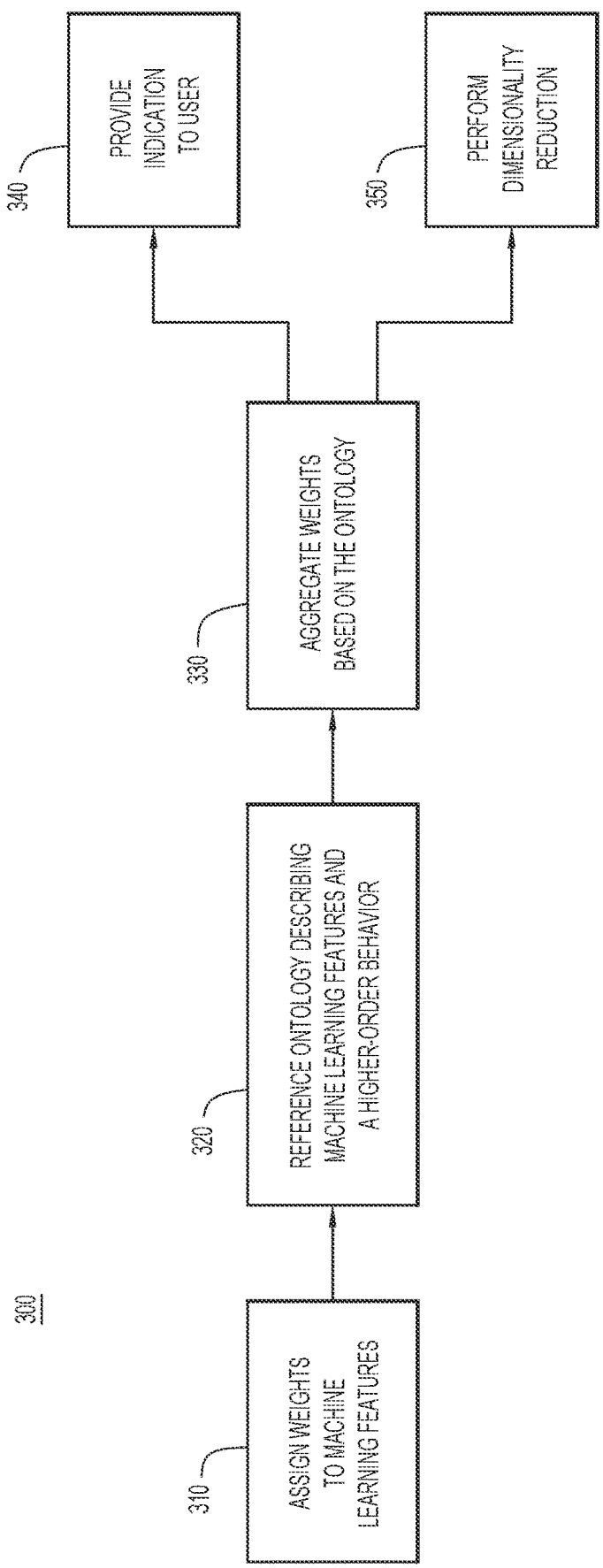
FIG. 3 is a flowchart of a method for automatically identifying higher-order behaviors in a network, according to an example embodiment.

FIG. 3 is a flowchart of a method 300 for automatically identifying higher-order behaviors in a network (e.g., network 105). Method 300 may be performed by a network security threat detection server (e.g., network security threat detection server 110). For example, if a network security threat detection server detects malicious software files, method 300 may enable the network security threat detection server to provide the reason(s) explaining how/why the machine learning process detected one or more of the malicious software files.

At 310, the network security threat detection server assigns weights to machine learning features. After running a machine learning process for tasks such as classification, regression, or anomaly detection, each machine learning feature may be assigned a weight. In one example, the network security threat detection server may assign weights to the machine learning features that are most important in producing a machine learning result.

At 320, the network security threat detection server references an ontology describing the machine learning features and a higher-order behavior. The ontology may define the machine learning features and specify how those machine learning features relate to at least one higher-order behavior. The ontology may define the domain and range for the machine learning features, the higher-order behavior that presents a meaningful interpretation of network activity when certain conditions are met (e.g., when the derived values match the specified values), and an aggregation strategy to accurately summarize the significance of the higher-order behavior.

At 330, the network security threat detection server may aggregate the weights based on the ontology. There are many options for aggregating the weights to produce the aggregated weight. Possible aggregation functions include calculating a summation, maximum, arithmetic mean, harmonic mean, and/or conditional summation of the weights. In one example, the weights may be normalized before aggregation. In another example, a normalization function may be applied after aggregating the weights to represent the weights as a percentage significance. The summation and maximum functions may produce a higher aggregated weight than the arithmetic and harmonic means.

At 340, the network security threat detection server provides an indication of the higher-order behavior and aggregated weight to the user to explain the rationale for the machine learning approach. In one example, only the aggregated weight, and not the original weights, are provided to the user. The aggregated weight may potentially simplify hundreds of machine learning features that have a correlated behavior under certain conditions. Accordingly, users may no longer need to examine large numbers of machine learning features to identify meaningful and explainable higher-order behaviors. The significance of the behavior may not be diluted into a large set of machine learning features (e.g., the combined impact of the activity may not be lost in the noise). Moreover, the ontology may be reusable to capture new higher-order behaviors using well-defined and structured explainability models.

At 350, the network security threat detection server may perform dimensionality reduction using the higher-order behavior. Dimensionality reduction may be used in conjunction with supervised and unsupervised machine learning processes to reduce the overall complexity of the machine learning feature space while preserving the essential underlying information. Conventionally, new synthetic dimensions produced by dimensionality reduction can be difficult to understand, and explanations arising from that space can be obtuse. Using the higher-order behavior grouping for dimensionality reduction may create a dimension-lowering projection that is both mathematically founded and intuitively interpretable. For example, the network security threat detection server may perform a further machine-learning process (e.g., clustering) based on the dimensionality reduction.

Optionally, the network security threat detection server may identify an additional higher-order behavior based on the machine learning result and the higher-order behavior. This may permit the network security threat detection server to provide further context/information of the machine learning result. For example, the machine learning result may be "Host confirmed as infected," and the higher-order behavior may be "Host does not communicate internally." In this example, the ontology may define an additional higher-order behavior, e.g., that no lateral malware movement has been detected.

Figure 4:
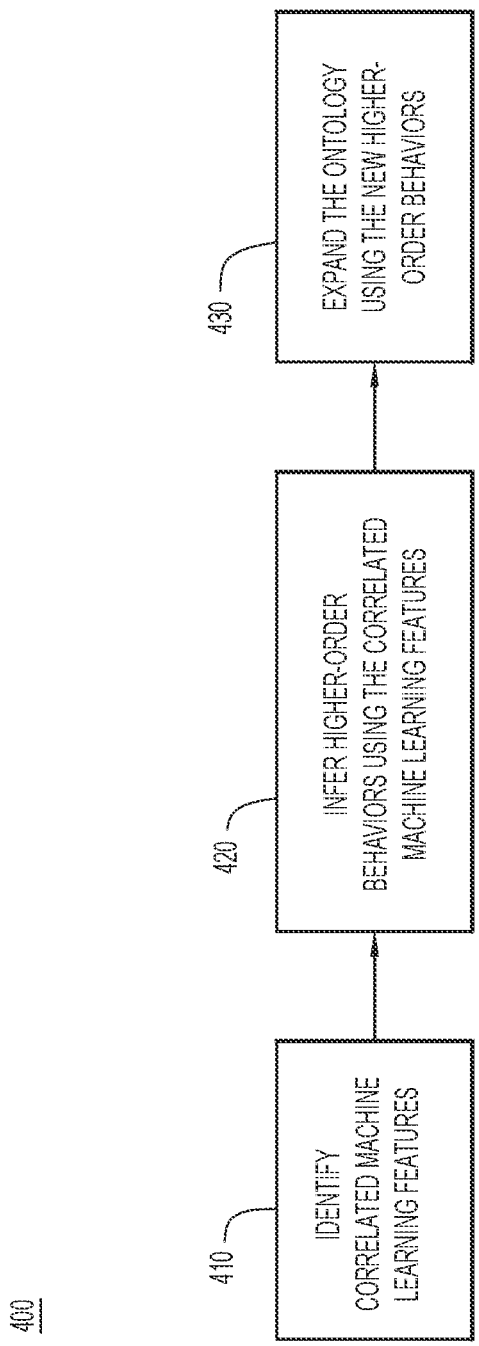
FIG. 4 is a flowchart of a method for automatically inferring new higher-order behaviors in a network, according to an example embodiment.

FIG. 4 is a flowchart of a method 400 for automatically inferring new higher-order behaviors in a network (e.g., network 105). Method 400 may be performed by a network security threat detection server (e.g., network security threat detection server 110). Briefly, automated techniques may be implemented to identify groups of correlated machine learning features as candidates for a higher-order behavior when certain conditions are satisfied.

At 410, the network security threat detection server identifies correlated machine learning features to identify common patterns of behavior. This may enable the ontology to be expanded by labeling these behavioral patterns as a single higher-order behavior. In one example, the network security threat detection server generates a histogram of at least two machine learning features according to the derived values of those machine learning features and identifies the machine learning features based on the histogram. For example, after discretizing between "zero" and "greater than zero," the flows sent to external peers and the external peer count may both be highly correlated (with a correlation of one). Whereas conventional machine learning explanation approaches would interpret these as separate machine learning features (with separate weights), the network security threat detection server described herein may provide the higher-order behavior and aggregated weight.

At 420, the network security threat detection server provides a meaningful higher-order behavior label (e.g., predicate) to the combination of identified machine learning features. In one example, subject matter experts may label these machine learning features with explanations (e.g., the higher-order behavior) based on the expert knowledge of the domain. For instance, network devices that send zero flows to external systems and have zero external peers may be described more generally (i.e., as a higher-order behavior) as not communicating with external hosts. Thus, the network security threat detection server may infer a new relationship between correlated machine learning features and a new higher-order behavior for specified values of those machine learning features.

At 430, the network security threat detection server may expand the ontology using the new higher-order behavior(s) (e.g., by adding the new relationship to the ontology). The higher-order behavior may be encoded into the ontology as an OWL class. The ontology may be expanded to include a set of conditions (e.g., specified values) for the behavior to be valid. The network security threat detection server may automatically provide the specified values. The ontology may also be expanded to include a set of correlated machine learning features to aggregate into the more meaningful and explainable higher-order behavior. This may also be provided automatically by the network security threat detection server. The ontology may be further expanded to include a human-readable description of the higher-order behavior.

Figure 5:
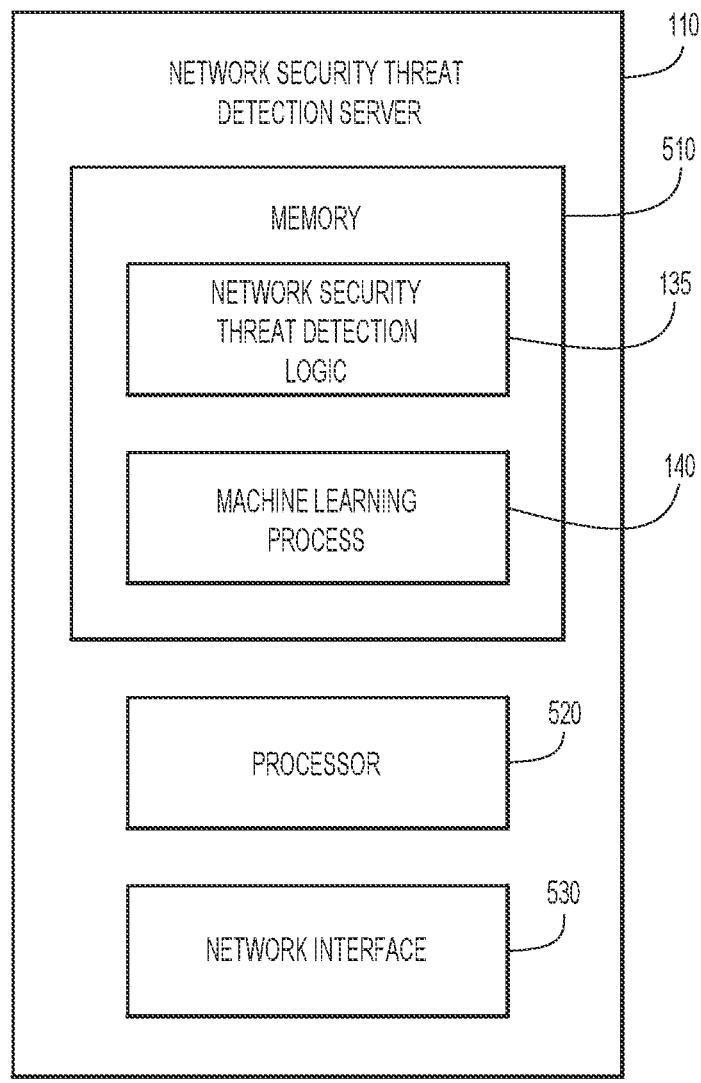
FIG. 5 is a block diagram of a computing device configured to automatically identify higher-order behaviors in a network, according to an example embodiment.

FIG. 5 is a simplified block diagram of network security threat detection server 110. In this example, the network security threat detection server 110 includes a memory 510, one or more processors 520, and a network interface 530. Memory 510 stores instructions for network security threat detection logic 135 and machine learning process 140. The one or more processors 520 are configured to execute instructions stored in the memory 510 for the network security threat detection logic 135. When executed by the one or more processors 520, the network security threat detection logic 135 causes the network security threat detection server 110 to perform operations described herein. The network interface 530 is a network interface card (or multiple instances of such a device) or other network interface device that enables network communications on behalf of the network security threat detection server 110 for sending and receiving network communications as described above.

The memory 510 may be read only memory (ROM), random access memory (RAM), magnetic disk storage media devices, optical storage media devices, flash memory devices, electrical, optical, or other physical/tangible memory storage devices. Thus, in general, the memory 510 may be one or more tangible (non-transitory) computer readable storage media (e.g., a memory device) encoded with software comprising computer executable instructions and when the software is executed (by the processor 520) it is operable to perform operations described herein.

Figure 6:
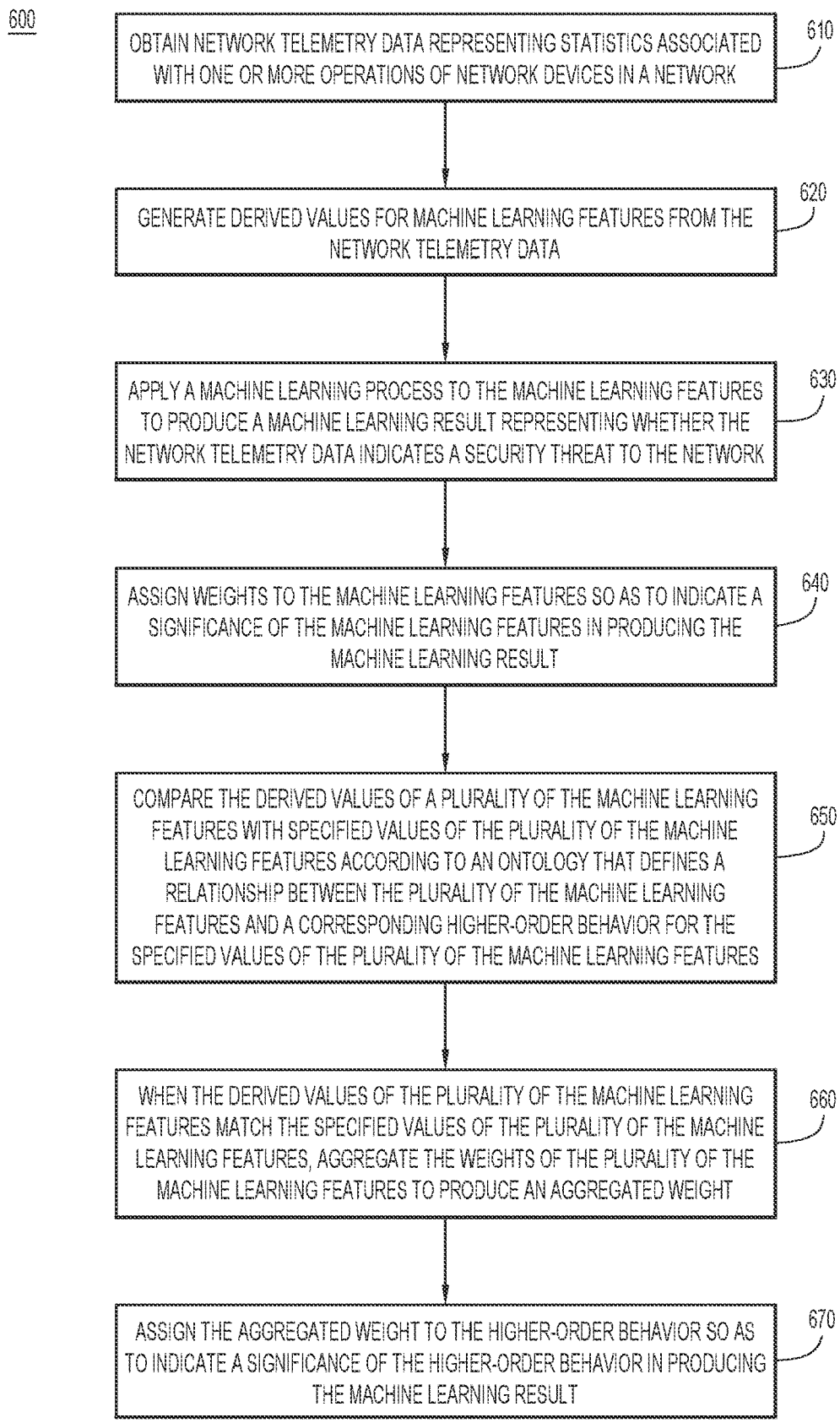
FIG. 6 is a flowchart of another method for automatically identifying higher-order behaviors in a network, according to an example embodiment.

FIG. 6 is a flowchart of an example method 600 for automatically identifying higher-order behaviors in a network (e.g., network 105). Method 600 may be performed by a network security threat detection server (e.g., network security threat detection server 110). At 610, the network security threat detection server obtains network telemetry data representing statistics associated with one or more operations of network devices in a network and, at 620, generates derived values for machine learning features from the network telemetry data. At 630, the network security threat detection server applies a machine learning process to the machine learning features to produce a machine learning result representing whether the network telemetry data indicates a security threat to the network. At 640, the network security threat detection server assigns weights to the machine learning features so as to indicate a significance of the machine learning features in producing the machine learning result.

At 650, the network security threat detection server compares the derived values of a plurality of the machine learning features with specified values of the plurality of the machine learning features according to an ontology that defines a relationship between the plurality of the machine learning features and a corresponding higher-order behavior for the specified values of the plurality of the machine learning features. At 660, when the derived values of the plurality of the machine learning features match the specified values of the plurality of the machine learning features, the network security threat detection server aggregates the weights of the plurality of the machine learning features to produce an aggregated weight. At 670, the network security threat detection server assigns the aggregated weight to the higher-order behavior so as to indicate a significance of the higher-order behavior in producing the machine learning result.

The network security threat detection server may provide explanations for assertions (conclusions) made from a machine learning process. Ontological models may be used to represent a logical structure and capture/represent the semantics of machine learning features within an analytic pipeline. A machine learning process may make an assertion while an ontological reasoning engine simultaneously computes an explanation of how/why the machine learning process reached that conclusion (e.g., to a non-data scientist).

Techniques described herein may enable a user to have the following conversation with an artificial intelligence agent:
Agent: I have found a threat actor operating at your branch office in Los Angeles. Would you like me to remove that device from the network?
User: Yes, I would like to quarantine this device, but please tell me how you arrived at this conclusion.
Agent: I can display my computational paths and machine learning processes. Would you still like me to remove this device from the network?
User: Don't do anything until you can share the evidence of your investigation with me.

In one form, a method is provided. The method comprises: obtaining network telemetry data representing statistics associated with one or more operations of network devices in a network; generating derived values for machine learning features from the network telemetry data; applying a machine learning process to the machine learning features to produce a machine learning result representing whether the network telemetry data indicates a security threat to the network; assigning weights to the machine learning features so as to indicate a significance of the machine learning features in producing the machine learning result; comparing the derived values of a plurality of the machine learning features with specified values of the plurality of the machine learning features according to an ontology that defines a relationship between the plurality of the machine learning features and a corresponding higher-order behavior for the specified values of the plurality of the machine learning features; when the derived values of the plurality of the machine learning features match the specified values of the plurality of the machine learning features, aggregating the weights of the plurality of the machine learning features to produce an aggregated weight; and assigning the aggregated weight to the higher-order behavior so as to indicate a significance of the higher-order behavior in producing the machine learning result.

In another form, an apparatus is provided. The apparatus comprises: a network interface configured to send and/or receive network communications; and one or more processors coupled to the network interface, wherein the one or more processors are configured to: obtain network telemetry data representing statistics associated with one or more operations of network devices in a network; generate derived values for machine learning features from the network telemetry data; apply a machine learning process to the machine learning features to produce a machine learning result representing whether the network telemetry data indicates a security threat to the network; assign weights to the machine learning features so as to indicate a significance of the machine learning features in producing the machine learning result; compare the derived values of a plurality of the machine learning features with specified values of the plurality of the machine learning features according to an ontology that defines a relationship between the plurality of the machine learning features and a corresponding higher-order behavior for the specified values of the plurality of the machine learning features; when the derived values of the plurality of the machine learning features match the specified values of the plurality of the machine learning features, aggregate the weights of the plurality of the machine learning features to produce an aggregated weight; and assign the aggregated weight to the higher-order behavior so as to indicate a significance of the higher-order behavior in producing the machine learning result.

In another form, one or more non-transitory computer readable storage media are provided. The non-transitory computer readable storage media are encoded with instructions that, when executed by a processor, cause the processor to: obtain network telemetry data representing statistics associated with one or more operations of network devices in a network; generate derived values for machine learning features from the network telemetry data; apply a machine learning process to the machine learning features to produce a machine learning result representing whether the network telemetry data indicates a security threat to the network; assign weights to the machine learning features so as to indicate a significance of the machine learning features in producing the machine learning result; compare the derived values of a plurality of the machine learning features with specified values of the plurality of the machine learning features according to an ontology that defines a relationship between the plurality of the machine learning features and a corresponding higher-order behavior for the specified values of the plurality of the machine learning features; when the derived values of the plurality of the machine learning features match the specified values of the plurality of the machine learning features, aggregate the weights of the plurality of the machine learning features to produce an aggregated weight; and assign the aggregated weight to the higher-order behavior so as to indicate a significance of the higher-order behavior in producing the machine learning result.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:
1. A method comprising:
obtaining network telemetry data representing statistics associated with one or more operations of network devices in a network;
generating derived values for machine learning features from the network telemetry data;
applying a machine learning process to the machine learning features to produce a machine learning result representing whether the network telemetry data indicates a security threat to the network;
assigning weights to the machine learning features so as to indicate a significance of the machine learning features in producing the machine learning result;
comparing the derived values of a plurality of the machine learning features with specified values of the plurality of the machine learning features according to an ontology that defines a relationship between the plurality of the machine learning features and a corresponding higher-order behavior for the specified values of the plurality of the machine learning features;
when the derived values of the plurality of the machine learning features match the specified values of the plurality of the machine learning features, aggregating the weights of the plurality of the machine learning features to produce an aggregated weight; and
assigning the aggregated weight to the higher-order behavior so as to indicate a significance of the higher-order behavior in producing the machine learning result.

2. The method of claim 1, further comprising:
identifying at least two correlated machine learning features based on derived values of the at least two correlated machine learning features;
inferring a new relationship between the at least two correlated machine learning features and a new higher-order behavior for specified values of the at least two correlated machine learning features; and
adding the new relationship to the ontology.

3. The method of claim 2, further comprising:
generating a histogram of the at least two correlated machine learning features according to the derived values of the at least two correlated machine learning features;
wherein identifying the at least two correlated machine learning features includes identifying the at least two correlated machine learning features based on the histogram.

4. The method of claim 1, further comprising:
identifying an additional higher-order behavior based on the machine learning result and the higher-order behavior.

5. The method of claim 1, further comprising:
performing dimensionality reduction using the higher-order behavior; and
applying a further machine-learning process based on the dimensionality reduction.

6. The method of claim 1, wherein aggregating the weights includes summing the weights to produce the aggregated weight.

7. The method of claim 1, further comprising:
providing an indication of the aggregated weight and the higher-order behavior to a network management user interface.

8. An apparatus comprising:
a network interface configured to send and/or receive network communications; and
one or more processors coupled to the network interface, wherein the one or more processors are configured to:
obtain network telemetry data representing statistics associated with one or more operations of network devices in a network;
generate derived values for machine learning features from the network telemetry data;
apply a machine learning process to the machine learning features to produce a machine learning result representing whether the network telemetry data indicates a security threat to the network;
assign weights to the machine learning features so as to indicate a significance of the machine learning features in producing the machine learning result;
compare the derived values of a plurality of the machine learning features with specified values of the plurality of the machine learning features according to an ontology that defines a relationship between the plurality of the machine learning features and a corresponding higher-order behavior for the specified values of the plurality of the machine learning features;
when the derived values of the plurality of the machine learning features match the specified values of the plurality of the machine learning features, aggregate the weights of the plurality of the machine learning features to produce an aggregated weight; and
assign the aggregated weight to the higher-order behavior so as to indicate a significance of the higher-order behavior in producing the machine learning result.

9. The apparatus of claim 8, wherein the one or more processors are further configured to:
identify at least two correlated machine learning features based on derived values of the at least two correlated machine learning features;
infer a new relationship between the at least two correlated machine learning features and a new higher-order behavior for specified values of the at least two correlated machine learning features; and
add the new relationship to the ontology.

10. The apparatus of claim 9, wherein the one or more processors are further configured to:
generate a histogram of the at least two correlated machine learning features according to the derived values of the at least two correlated machine learning features; and
identify the at least two correlated machine learning features based on the histogram.

11. The apparatus of claim 8, wherein the one or more processors are further configured to:
identify an additional higher-order behavior based on the machine learning result and the higher-order behavior.

12. The apparatus of claim 8, wherein the one or more processors are further configured to:
perform dimensionality reduction using the higher-order behavior; and
apply a further machine-learning process based on the dimensionality reduction.

13. The apparatus of claim 8, wherein the one or more processors are configured to aggregate the weights by summing the weights to produce the aggregated weight.

14. The apparatus of claim 8, wherein the one or more processors are further configured to:
provide an indication of the aggregated weight and the higher-order behavior to a network management user interface.

15. One or more non-transitory computer readable storage media encoded with instructions that, when executed by a processor, cause the processor to:
obtain network telemetry data representing statistics associated with one or more operations of network devices in a network;
generate derived values for machine learning features from the network telemetry data;
apply a machine learning process to the machine learning features to produce a machine learning result representing whether the network telemetry data indicates a security threat to the network;

assign weights to the machine learning features so as to indicate a significance of the machine learning features in producing the machine learning result;

compare the derived values of a plurality of the machine learning features with specified values of the plurality of the machine learning features according to an ontology that defines a relationship between the plurality of the machine learning features and a corresponding higher-order behavior for the specified values of the plurality of the machine learning features;

when the derived values of the plurality of the machine learning features match the specified values of the plurality of the machine learning features, aggregate the weights of the plurality of the machine learning features to produce an aggregated weight; and assign the aggregated weight to the higher-order behavior so as to indicate a significance of the higher-order behavior in producing the machine learning result.

16. The one or more non-transitory computer readable storage media of claim 15, wherein the instructions further cause the processor to:

identify at least two correlated machine learning features based on derived values of the at least two correlated machine learning features;

infer a new relationship between the at least two correlated machine learning features and a new higher-order behavior for specified values of the at least two correlated machine learning features; and add the new relationship to the ontology.

17. The one or more non-transitory computer readable storage media of claim 16, wherein the instructions further cause the processor to:

generate a histogram of the at least two correlated machine learning features according to the derived values of the at least two correlated machine learning features; and identify the at least two correlated machine learning features based on the histogram.

18. The one or more non-transitory computer readable storage media of claim 15, wherein the instructions further cause the processor to:

identify an additional higher-order behavior based on the machine learning result and the higher-order behavior.

19. The one or more non-transitory computer readable storage media of claim 15, wherein the instructions further cause the processor to:

perform dimensionality reduction using the higher-order behavior; and apply a further machine-learning process based on the dimensionality reduction.

20. The one or more non-transitory computer readable storage media of claim 15, wherein the instructions cause the processor to aggregate the weights by summing the weights to produce the aggregated weight.

* * * * *